United States Patent
Eatough et al.

(10) Patent No.: US 7,529,820 B2
(45) Date of Patent: May 5, 2009

(54) METHOD AND APPARATUS TO PERFORM AUTOMATED TASK HANDLING

(75) Inventors: David Eatough, Herriman, UT (US); Tony Sarra, Herriman, UT (US)

(73) Assignee: LANDesk Software, Inc., South Jordan, UT (US)

( * ) Notice: Subject to any disclaimer, the term of this patent is extended or adjusted under 35 U.S.C. 154(b) by 948 days.

(21) Appl. No.: 09/892,296

(22) Filed: Jun. 26, 2001

(65) Prior Publication Data
US 2003/0050955 A1 Mar. 13, 2003

(51) Int. Cl.
*G06F 15/173* (2006.01)

(52) U.S. Cl. ..................... 709/223; 718/103

(58) Field of Classification Search ........... 718/106, 718/103
See application file for complete search history.

(56) References Cited

U.S. PATENT DOCUMENTS 5,036,518 A * 7/1991 Tseung ............... 714/748
5,519,704 A * 5/1996 Farinacci et al. ........ 370/402

OTHER PUBLICATIONS

Gumbold, Marc; "Software Distribution by Reliable Multicast," Oct. 1996, IEEE, pp. 222-231.*
Asai, Kikuo et al. "Reliable Multicast File Transfer on the Inter-University Satellite Network," Aug. 2000, IEEE, vol. 2, pp. 1137-1140.*

* cited by examiner

*Primary Examiner*—Patrice Winder
*Assistant Examiner*—Azizul Choudhury
(74) *Attorney, Agent, or Firm*—Austin Rapp & Hardman

(57) ABSTRACT

A method and apparatus to perform reliable and efficient automated task handling is described.

5 Claims, 6 Drawing Sheets

METHOD AND APPARATUS TO PERFORM AUTOMATED TASK HANDLING

BACKGROUND

Automated task handling technology may facilitate the handling of tasks over a network. A network typically comprises a number of network nodes connected by communications media. One or more network nodes may be configured to automatically perform a task for other network nodes connected to the network. For example, a server may install new software on various network nodes using the network. This may reduce the time and cost for a user to manually complete a task, particularly for those tasks involving a large number of network nodes. Accordingly, improved automated task handling technologies that are more robust and reliable than conventional solutions may yield even further benefits.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
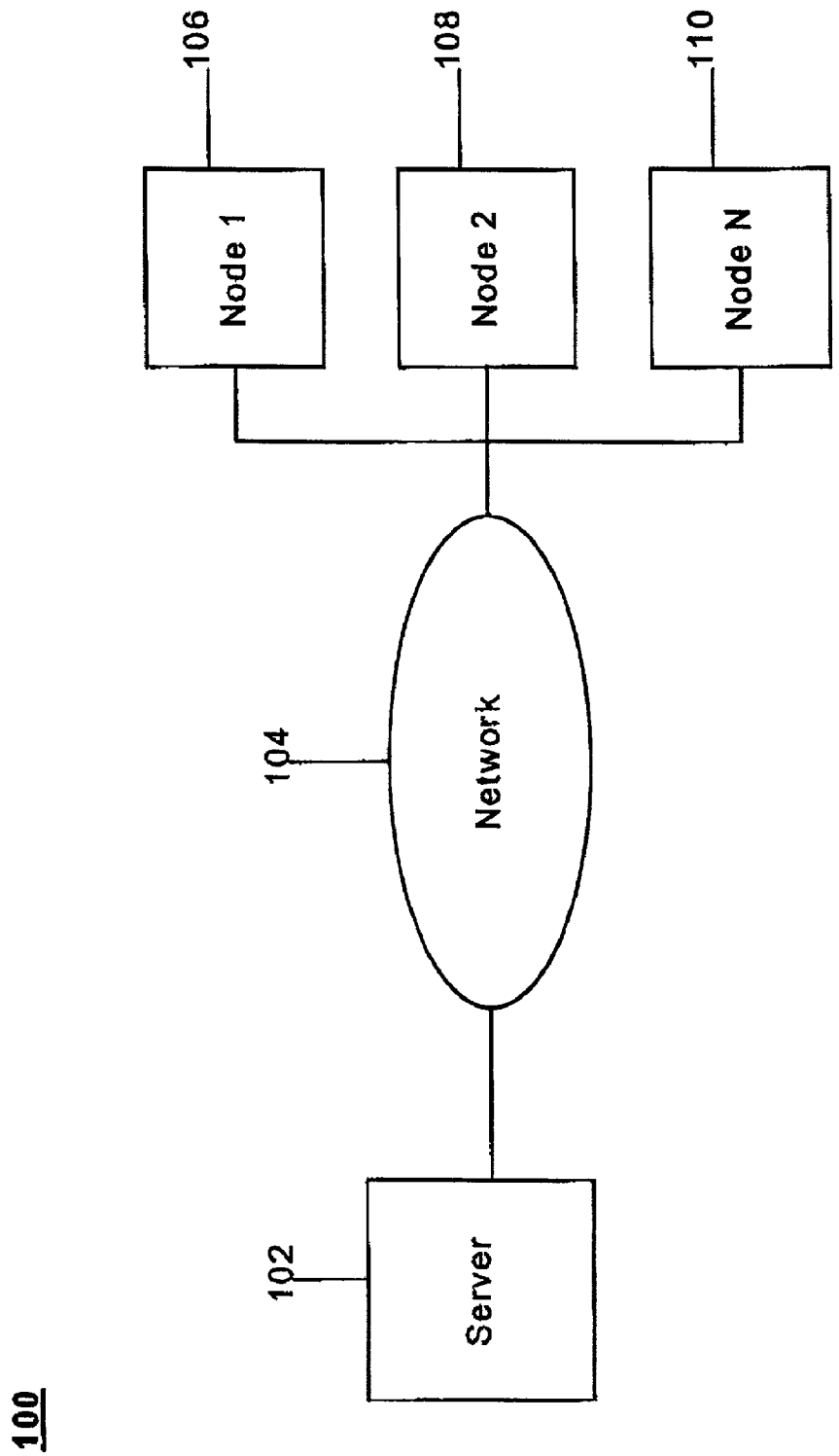
FIG. 1 is a system suitable for practicing one embodiment of the invention.

In the following detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention.

Automated task handling technology may facilitate the handling of tasks over a network. Conventional task handling systems typically use one of three technologies, referred to as "push" technology, "pull" technology and "just in time (JIT) pull" technology. The term "task" may be referred to herein as a set of actions that may be applied to a network node. Examples of a task may include copying a file, installing a software application, sending batch data such as emails, and so forth.

Push technology may refer to when a particular network node distributes information to a group of network nodes based on conditions defined at the distributing network node. For example, the distributing network node may be configured to install new software on the group of network nodes at a certain date and/or time. In other words, the distributing network node may push a task to the other network nodes. The task may be triggered by an event occurring on the distributing network node or the network. An example of a triggering event may include reaching a certain date and/or time, completion of another event, network utilization dropping below a predetermined amount, network utilization rising above a predetermined amount, and so forth.

Push distribution technologies may provide an efficient method for distributing to a group of network nodes since the distribution is centrally controlled. Push technologies may also support other technologies that make distribution more effective, including multicast technology and "wake" technology. Multicast technology may broadcast messages across a network in accordance with a number of point-to-multipoint communications protocols. Wake technology may be used to turn on power to an inactive network node or otherwise establish a connection with an inactive network node to perform the task. Push technologies may be particularly efficient for enterprise organizations that need to distribute data to a large number of network nodes.

Even the best push technologies, however, may fail to reach all of the target machines. The target machine is often not reachable because it is powered off, is not currently connected to the network, has an incorrect Domain Name Server (DNS) entry, and so forth. The failure of push technology to reach every target system may require an administrator to determine what systems have failed and reschedule the task to those systems or use alternate methods for deploying the data to the failed systems.

Pull technology may refer to when a network node requests a task from the distributing network node. For example, a network node may connect to a network and request that any outstanding tasks not yet completed for the network node be completed now. In other words, the network node may pull a task from the distributing network node.

Just in time pull technology is a form of pull technology that does not request a task until a specific event occurs, such as a request from a user. An example may include providing an icon on a screen displayed to a user. When the user selects the icon, the request is sent to the distributing network node for a task. This may typically occur whenever a user may desire use of a software application after receiving a computer from the manufacturer without the desired software preinstalled.

Pull technologies, including JIT pull technologies, may allow the target system to initiate the transfer of the data. This may provide a more reliable solution than push technologies but results in inefficient usage of network resources. This inefficiency occurs because each system pulls the data using a one-to-one connection, sometimes referred to as a "unicast" transmission.

This inefficiency may be demonstrated using the following example. Assume an administrator desires to deploy a software application to 1000 network nodes using push technology. Further assume that the software application comprises 1 megabit (MB) of data. The distributing network node may send the 1 MB set of data to the 1000 network nodes in a single multicast transmission, thereby consuming only 1 MB worth of network bandwidth. By way of contrast, if each of the 1000 network nodes were to pull the software application from the distributing network node, the pull technology would consume 1000 MB worth of network bandwidth to accomplish the same task.

The embodiments of the invention may combine push and pull technologies to realize the advantages provided by both, and reduce the associated disadvantages. In one embodiment of the invention, a task is initially performed using push technology. This may reach a large number of target systems while reducing bandwidth requirements. For those target systems in which a task failed, those target systems may use pull technology to complete the task. This capitalizes on the reliability offered by pull technologies, while potentially avoiding the need for a system administrator to determine which systems have failed and reschedule the task using the push technology.

The advantages offered by one embodiment of the invention may be demonstrated using the prior example. An administrator may need to deploy a software application to 1000 users in a reliable and efficient manner. One embodiment of the invention first attempts to push the software application to all 1000 users. This push distribution is done using multicast so that the amount of network traffic generated is reduced. In our example, assume that 900 of the target systems successfully receive the multicast software application and are able to install the application. When the remaining 100 systems log into the network, they may contact the core server and determine that they missed the software application distribution. Each of these systems may then have the software application sent to them in a unicast or point-to-point fashion. In this example, all 1000 systems may receive the package. Because all of the systems receive the software application it is more reliable than traditional push technologies. Because 900 of the target systems receive the package via a multicast transmission reliable task handling is more efficient than traditional pull technologies.

Table 1 illustrates the network usage and number of target devices that will receive the intended data. Table 1 assumes that there are 1000 target devices, 1 MB of data to be transferred to each target system, that 90% of all target machines will successfully receive the multicast, and that 100% of the remaining target machines will successfully pull the data.

TABLE 1

| Feature | Push Technology | Pull Technology | Reliable Task Handling |
| --- | --- | --- | --- |
| Bandwidth used | 1 MB | 1,000 MB | 101 MB |
| Number of targets reached | 900 | 1000 | 1000 |

As the values in Table 1 illustrate, this embodiment of the invention is able to provide a better success rate than push technologies and makes more efficient use of network resources than pull technologies. It further provides the ability to use the bandwidth efficiencies of push distribution while ensuring that all clients will reliably receive the package. This offers substantial benefits versus conventional push and pull solutions available today.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a server 102, a network 104, and nodes 106, 108 and 110. In this embodiment of the invention, server 102 operates to complete tasks for nodes 106, 108 and 110 via network 104. Nodes 106, 108 and 110 may be any network nodes, such as personal computers, Internet terminals, servers, routers, switches, bridges, repeaters, amplifiers, printers and so forth. Network 104 may comprise any number of network nodes and communications media, with the appropriate hardware, software, protocols and connectors to communicate information between server 102 and nodes 106, 108 and 110. System 100 is limited to server 102, network 104 and nodes 106, 108 and 110 for purposes of clarity only. It can be appreciated that any number of nodes may be made part of system 100 and still fall within this embodiment of the invention.

Figure 2:
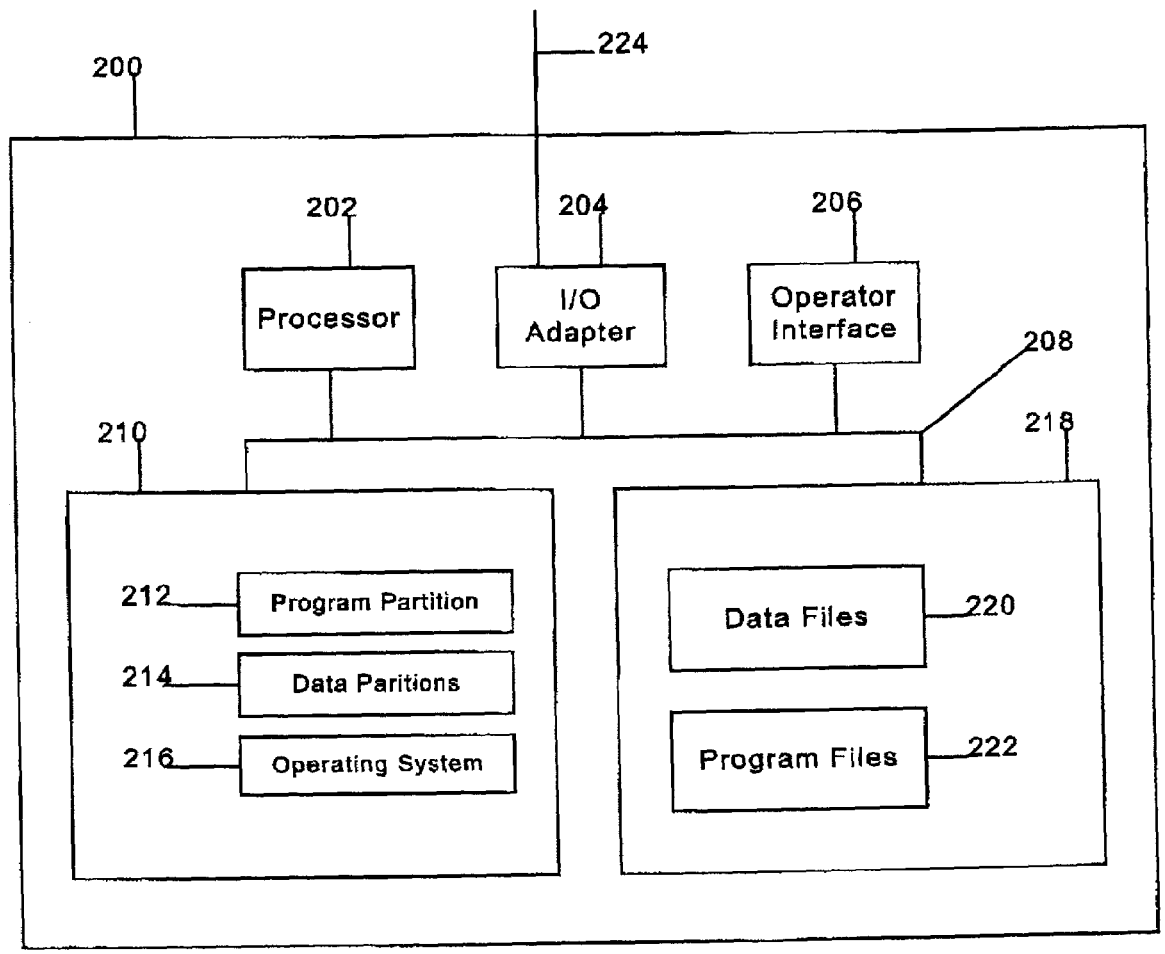
FIG. 2 is a block diagram of a computer system in accordance with one embodiment of the invention.

FIG. 2 illustrates a processing system in accordance with one embodiment of the invention. In one embodiment of the invention, a processing system 200 may be representative of server 102, node 106, node 108, node 110 or any other network node that is included as part of system 100. As shown in FIG. 2, system 200 includes a processor 202, an input/output (I/O) adapter 204, an operator interface 206, a memory 210 and a disk storage 218. Memory 210 may store computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++, JAVA, assembly and so forth. Processor 202 executes the program instructions, and processes the data, stored in memory 210. Disk storage 218 stores data to be transferred to and from memory 210. I/O adapter 204 communicates with other devices and transfers data in and out of the computer system over connection 224. Operator interface 206 may interface with a system operator by accepting commands and providing status information. All these elements are interconnected by bus 208, which allows data to be intercommunicated between the elements. I/O adapter 204 represents one or more I/O adapters or network interfaces that can connect to local or wide area networks such as, for example, the network described in FIG. 1. Therefore, connection 224 represents a network or a direct connection to other equipment.

Processor 202 can be any type of processor capable of providing the speed and functionality required by the embodiments of the invention. For example, processor 202 could be a processor from family of processors made by Intel Corporation, Motorola Incorporated, Sun Microsystems Incorporated, Compaq Computer Corporation and others. Processor 202 may also comprise a digital signal processor (DSP) and accompanying architecture, such as a DSP from Texas Instruments Incorporated.

In one embodiment of the invention, memory 210 and disk storage 218 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, client 200 may contain various combinations of machine-readable storage devices through various I/O controllers, which are accessible by processor 202 and which are capable of storing a combination of computer program instructions and data.

Memory 210 is accessible by processor 202 over bus 208 and includes an operating system 216, a program partition 212 and a data partition 214. In one embodiment of the invention, operating system 216 may comprise an operating system sold by Microsoft Corporation, such as Microsoft Windows® 95, 98, 2000 and NT, for example. Program partition 212 stores and allows execution by processor 202 of program instructions that implement the functions of each respective system described herein. Data partition 214 is accessible by processor 202 and stores data used during the execution of program instructions. In one embodiment of the invention, program partition 212 contains program instructions that will be collectively referred to herein as a task manager module, a task handler module and a task finisher module. Of course, the scope of the invention is not limited to these particular modules or sets of instructions.

The task manager module may perform the functions for the overall management of the automated task handler operations, including pushing information to nodes 106, 108 and/or 110 via multicast or other push technologies, distributing information pulled by nodes 106, 108 and/or 110, and maintaining and updating a task status table having status indicators indicating whether a task has been completed for a group of target devices.

The task handler module may receive the task information and may complete the task for each target device. For example, if the task is to install a new software application, the task handler will perform the installation on the target device. In one embodiment of the invention, each target device has its own task handler module. In another embodiment of the invention, one or more task handler modules are shared among a number of target devices.

The task finisher module operates to ensure that the task is completed for a particular target device. For example, if a target device did not receive the information for a particular task during the push phase, the target device may request task completion at a later date and/or time via pull technologies.

I/O adapter 204 may comprise a network adapter or network interface card (NIC) configured to operate with any suitable technique for controlling communication signals between computer or network devices using a desired set of communications protocols, services and operating procedures, for example. In one embodiment of the invention, I/O adapter 204 may operate, for example, in accordance with the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from "www.ietf.org." Although I/O adapter 204 may operate with in accordance with the above described protocols, it can be appreciated that I/O adapter 204 may operate with any suitable technique for controlling communication signals between computer or network devices using a desired set of communications protocols, services and operating procedures, for example, and still fall within the scope of the invention.

I/O adapter 204 also includes appropriate connectors for connecting I/O adapter 204 with a suitable communications medium. I/O adapter 204 may receive communication signals over any suitable medium such as copper leads, twisted-pair wire, co-axial cable, fiber optics, radio frequencies, and so forth.

Figure 3:
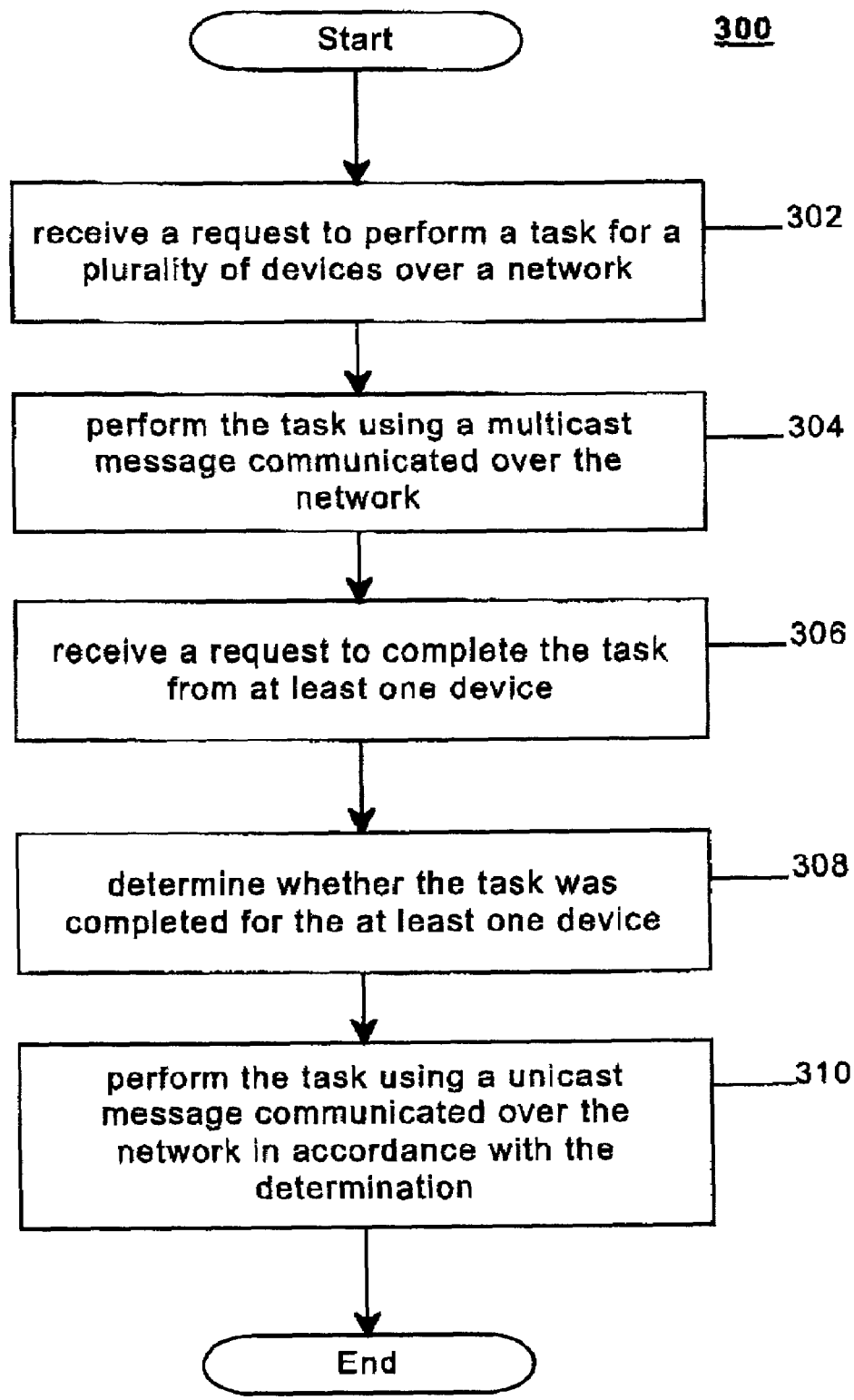
FIG. 3 is a block flow diagram of programming logic for a task manager module in accordance with one embodiment of the invention.
Figure 4:
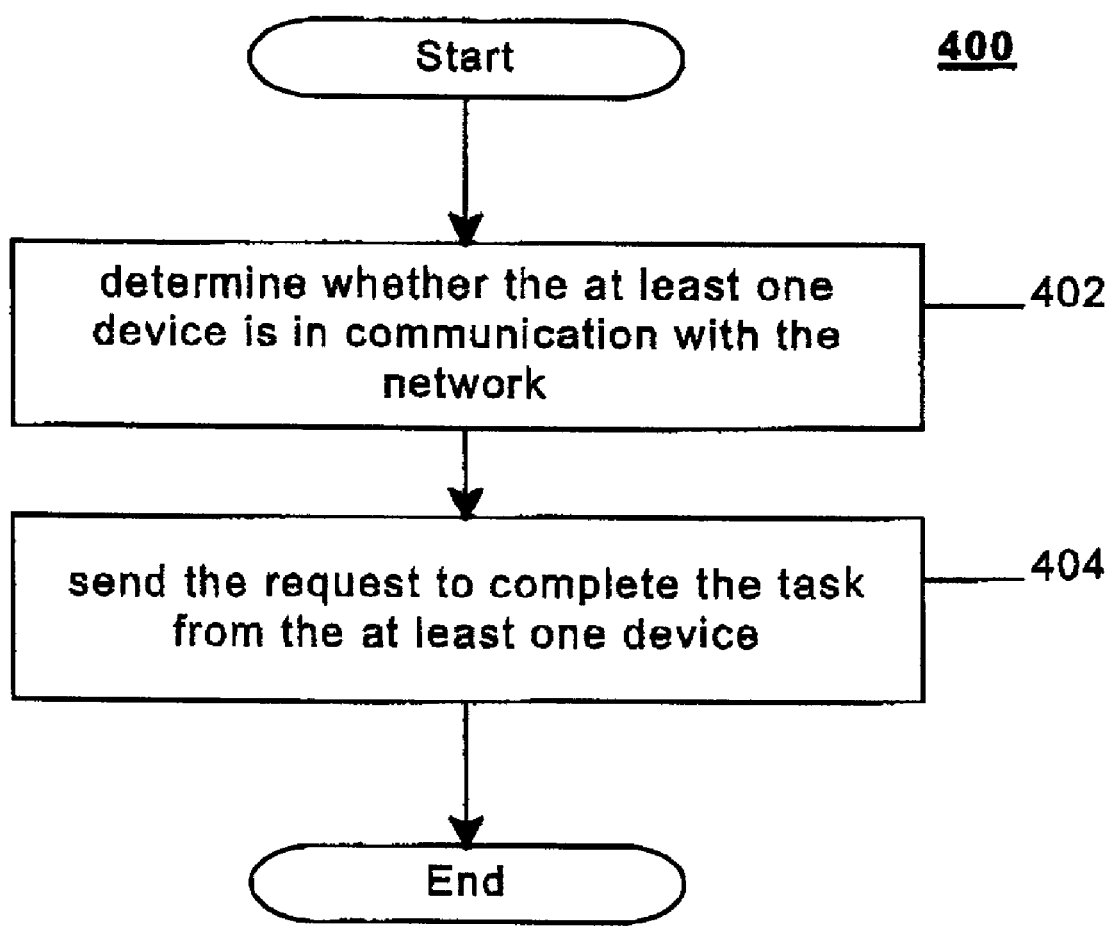
FIG. 4 is a block flow diagram of programming logic for a task finisher module in accordance with one embodiment of the invention.

The operations of systems 100 and 200 may be further described with reference to FIGS. 3 and 4 and accompanying examples. Although FIGS. 3 and 4 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIG. 3 is a block flow diagram of the programming logic performed by a task manager module in accordance with one embodiment of the invention. In one embodiment of the invention, the task manager module may refer to the software and/or hardware used to implement the functionality for reliable automated task handling as described herein. In this embodiment of the invention, the task handler module may be implemented as part of server 102. It can be appreciated that this functionality, however, may be implemented by any device, or combination of devices, located anywhere in a communication network and still fall within the scope of the invention.

As shown in FIG. 3, programming logic 300 describes programming logic to perform automated task handling over a network. In one embodiment of the invention, a request to perform a task for a plurality of devices over a network may be received at block 302. The task may be performed using a multicast or broadcast message communicated over the network at block 304. In one embodiment of the invention, block 302 may be performed using IP multicast in accordance with IETF RFC 1112, adopted in August, 1989, and available at "www.ietf.org". A request to complete the task may be received from at least one device at block 306. A determination may be made as to whether the task was previously completed for the at least one device at block 308. At block 310, the task may be performed for the at least one device using a unicast message communicated over the network in accordance with the determination made at block 308.

The determination at block 308 may be made in a number of different ways. For example, in one embodiment of the invention an identifier is received for the at least one device. A task status table may be searched using the received identifier. A status indicator associated with the identifier may be retrieved. The retrieved status indicator may be used to determine whether the task was completed for the at least one device.

FIG. 4 is a block flow diagram of the programming logic performed by a task finisher module in accordance with one embodiment of the invention. In one embodiment of the invention, the task finisher module may refer to the software and/or hardware used to implement the functionality for reliable automated task handling as described herein. In this embodiment of the invention, the task finisher module may be implemented as part of nodes 106, 108 and/or 110. It can be appreciated that this functionality, however, may be implemented by any device, or combination of devices, located anywhere in a communication network and still fall within the scope of the invention.

As shown in FIG. 4, programming logic 400 describes programming logic to complete in a reliable manner automated task handling over a network. In one embodiment of the invention, a determination is made as to whether the at least one device is in communication with the network at the time the multicast message was sent at block 402. The request to complete the task may be sent from the at least one device in accordance with this determination 404. The request to complete a task may be referred to herein as a task completion request (TCR) message. The TCR message may include, for example, a unique identifier, an IP address and an IP subnet mask for the requesting device. This information may be stored in a task status table maintained by the task manager module.

In one embodiment of the invention, the task completion request is sent to the task manager module and contains the device identifier, IP address and IP subnet mask for the device requesting the completion of any uncompleted tasks. Because the IP address and IP subnet mask for the device may have changed, the task manager module may periodically update the information stored in the task status table. This may be accomplished, for example, using a discovery data structure as follows:

```
typedef struct_tagDISCOVERY_DATA
{
    int objid;
    DWORD dwInfoMask;
    char szDeviceID[ MAX_MAC_STR_LEN];
    char szIP[ MAX_MAC_STR_LEN];
    char szIPSubnet[ MAX_MAC_STR_LEN];
}   DISCOVERY_DATA, *PDISCOVERY_DATA,
    *LDISCOVERY_DATA;
```

The dwInfoMask member of the structure may define which fields are set, the value may be a bitwise combination of MASK_xxx values. For the discovery data structure the existing MASK_DEVICE_ID and MASK_IP can be specified as well as a new MASK_IP_SUBNET.

The following psudeo code shows how the task manager module may use this method.

Fill discovery data structure with device id, IP address, and IP subnet
Call FindAndUpdateMachine
    Attempt to locate machine based upon device id
    if machine not found
        return false
    update IP address and subnet of machine using information provided
    set the objid of the discovery data structure
    return true If the method returns true the task manager module may then attempt to determine if there are any incomplete tasks for the machine.

In another embodiment of the invention, the at least one device may automatically send a request message for completion of any uncompleted tasks since the last connection without making the determination at block 402. If the target device is inactive, it may be activated to establish a connection with the network using wake technology. One embodiment of the invention may utilize a circuit in a NIC or modem that is coupled to the target device, with the circuit being configured to detect a special packet even when the rest of the target device is off or in "suspended" mode. If the special packet is detected the NIC may send a command to turn the rest of the system on or switch to an active state.

Figure 5:
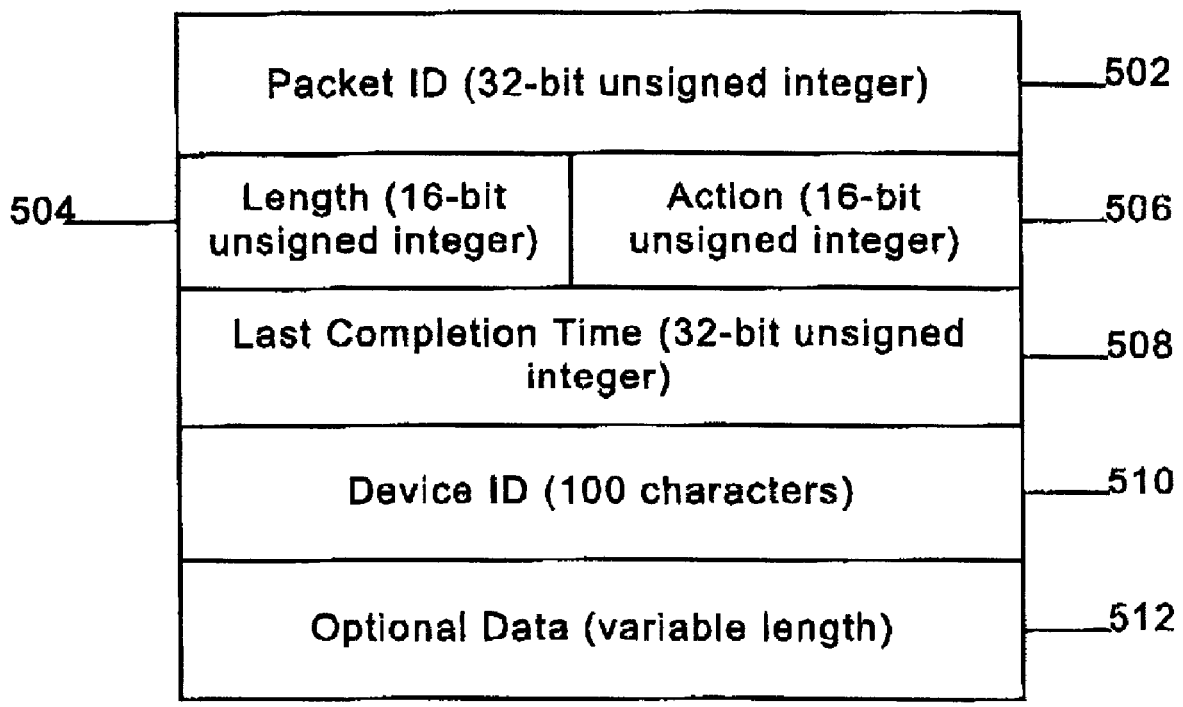
FIG. 5 illustrates a task completion request (TCR) message packet in accordance with one embodiment of the invention.

FIG. 5 illustrates a task completion request (TCR) message packet in accordance with one embodiment of the invention. FIG. 5 illustrates a TCR message packet 500. Packet 500 may comprise a packet identifier field 502 comprising a 32-bit unsigned integer, a length field 504 comprising a 16-bit unsigned integer, an action field 506 comprising a 16-bit unsigned integer, a last completion time field 508 comprising a 32-bit unsigned integer, a device identifier (ID) field 510 comprising up to 100 characters, and an optional data field 512 that may be variable in length, although the embodiments of the invention are not limited in this context.

Packet identifier field 502 may be used to confirm that packet 500 is valid. Length field 504 may indicate the length of the optional data in bytes included as part of optional data field 512. Last completion time field 508 may be used to prioritize which TCR message should be handled. Device ID field 510 may be used to uniquely identify the device sending the TCR message. Optional data field 512 may be used for optional data, such as additional control or data information.

Action field 506 may indicate what action the task manager module may perform. Examples of possible values are listed as part of Table 2. It is worthy to note that these values may be transmitted in network order, such as reverse byte order.

TABLE 2

| Action | Value | Meaning |
| --- | --- | --- |
| TCS_REQUEST | 0xAAAA | Managed node is requesting uncompleted tasks be completed now. Optional data is the IPv4 address of the machine. |
| TCS_BUSY | 0xBBBB | Indicates that the server is busy and cannot process the request |
| TCS_CANCEL | 0xCCCC | Managed nodes is requesting that the task completion process be canceled |
| TCS_ALL_DONE | 0x110A | Ack sent to the client, task completion service has successfully completed all outstanding tasks for the client |
| TCS_PART_DONE | 0xAD0B | Ack sent to the client, task complete service has finished processing tasks, all tasks were not completed successfully |
| TCS_REFUSED | 0xFFFF | Ack sent to the client indicating that the request was refused, no process will take place |
| TCS_IN_PROCESS | 0xAE0D | Informative message sent to the client to indicate the current task in progress. The option data will contain the name of the task |

Figure 6:
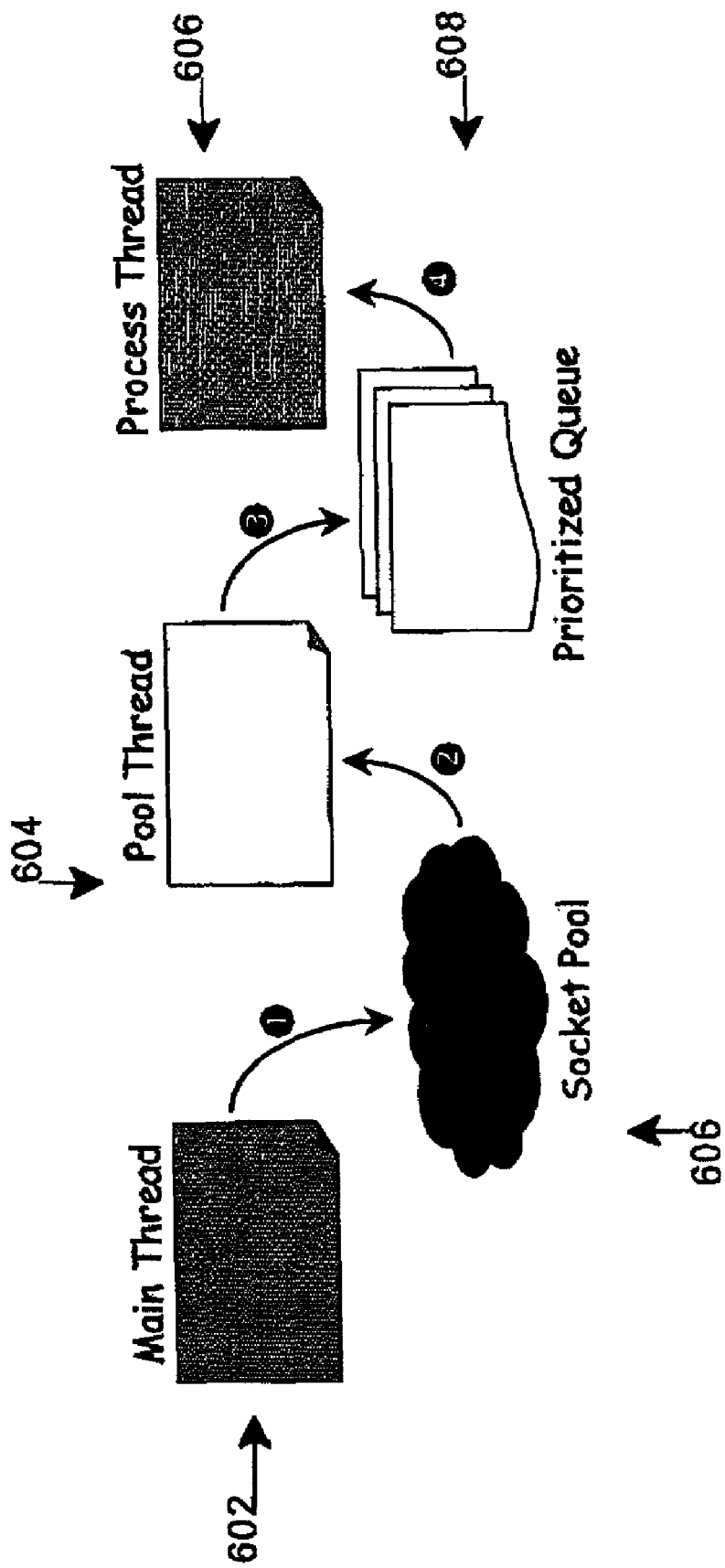
FIG. 6 illustrates a model of software threads in accordance with one embodiment of the invention.

FIG. 6 illustrates a model of software threads in accordance with one embodiment of the invention. The task manager module may be implemented using multiple threads. In one embodiment of the invention, the task manager module may be implemented using three threads, including a main thread 602, a pool thread 604 and a process thread 606.

Main thread 602 may control starting and shutting down pool thread 604 and process thread 606. After all three threads are started, main thread 602 monitors the server socket and accepts connections from clients. When a socket is accepted it is placed into socket pool 606, as indicated by the number 1 in FIG. 6.

Pool thread 604 may monitor the sockets in socket pool 606 to determine when the task manager module receives a TCS request, as indicated by the number 2 in FIG. 6. When a request is received it is placed into prioritized queue 608, as indicated by the number 3 in FIG. 6.

Prioritized queue 608 may prioritize received TCS requests based upon the last completion time reported in the packet. If the task manager module is busy, meaning more nodes have requested task completion than the task manager module may handle, the prioritizing of requests based upon the last completion time will ensure that the nodes who have waited for the longest period of time will be handled first. In one embodiment of the invention, prioritized queue 608 has a predetermined size. If adding a socket to the queue causes the queue to overflow the lowest priority socket may be removed from the queue and may be sent a busy signal.

Processing thread 606 may remove the highest priority item from prioritized queue 608, as indicated by the number 4 in FIG. 6, and determines if there are any uncompleted scripts tasks in accordance with the TCR message. If there are any uncompleted tasks, the task manager module may perform the uncompleted task.

The operation of systems 100 and 200, and the processing logic shown in FIGS. 3 and 4, may be better understood by way of example. In this example, the task manager module is implemented as part of server 102, while the task handler module and task finisher module are both implemented on each of nodes 106, 108 and 110. The task handler module coordinates the overall operations of the automated task handling for a network. The task manager may receive a request to perform a task for a plurality of network nodes over the network. For example, the task may be to update security information for 1000 remote user computers. The task manager may perform the task by sending a multicast message to the plurality of network nodes. The multicast message may comprise, for example, instructions or data to complete the task. In this example, it may include a file having: (1) an updated data file of new viruses; (2) an upgraded version of virus detection software in executable form; (3) an installation program to install the updated data file and upgraded virus detection software; and (4) instructions to the task handler on each of nodes 106, 108 and 110 to initiate execution of a file "install.exe" once the file is completely received by each node.

In this example, each network node may be configured to include a task handler. The task handler receives the multicast message from the task manager, and attempts to complete the task indicated by the message. In this example, the task handler will send instructions to the node operating system (OS) to execute "install.exe" during a time when the processor for the node is underutilized. Once the task handler successfully completes the task, it may send a status message back to the task manager.

The task manager may receive the status message from each of nodes 106, 108 and 110, including a unique identifier for each node. The task manager may record a status indicator for each task and each node using the unique identifier in a task status table. The status indicator may comprise, for example, a flag indicating that the task is "completed," "in process" or "uncompleted."

A target network node may not receive the multicast message for a number of reasons. For example, the network node may not be connected to the network when the task manager sends the message. Another example may include the network node having a physical connection to the network, but a failure in the communications hardware, software or connectors prevents communication between the task handler and the task manager. In another example, the network node may be unable to process data due to some failure elsewhere in the network node. In any event, if a network node fails to receive the multicast message, it may not complete the given task. This may be undesirable, or even unacceptable, depending on the nature of the task.

In our example, assume that network node 110 did not complete the task for any number of reasons. The next time network node 110 connects to network 104, the task finisher module implemented as part of network node 110 may send a request to complete any unfinished tasks for network node 110, as well as the unique identifier for node 110. The task manager may receive the request and identifier, and search the task status table for any uncompleted tasks for node 110. If an uncompleted task is identified during the search, the task manager may attempt to complete the task using a unicast or point-to-point connection between server 102 and node 110. Once the task is completed, the task finisher or task handler may send a status message to the task manager indicating this information.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to complete tasks over a network, comprising:
receiving, by a server computer, a request to perform a task for a plurality of computers over a network, wherein the task comprises installing a software application or updating a software application;
performing said task using a multicast message communicated from said server computer over said network, wherein the performance of said task is triggered by an event occurring on said server computer or said network;
updating a task status table by said server, wherein said task status table indicates whether said task has been completed for each of said plurality of computers;
receiving, by said server computer, a request to complete said task from a first computer;
prioritizing requests to complete said task, if more than one request is received by said server computer from each of a plurality of computers, the requests being prioritized based upon the last completion time of a prior request;
determining whether said task was completed for said first computer using said task status table;
performing said task using a unicast message communicated from said server computer over said network to said first computer in accordance with said determination and said prioritization; and
updating said task status table indicating whether said task has been completed for said first computer.

2. The method of claim 1, wherein said determining whether said task was completed for said first computer comprises:
receiving an identifier for said first computer;
searching said task status table using said identifier;
retrieving a status indicator associated with said identifier; and
determining whether said task was completed for said first computer using said status indicator.

3. The method of claim 1, wherein said receiving said request to complete said task from said first computer comprises:
determining whether said first computer is in communication with said network; and
sending said request to complete said task from said first computer.

4. A method to complete tasks over a network, comprising:
receiving, by a server computer, a request to perform a task for a plurality of devices over a network, wherein the task comprises installing a software application or updating a software application;
performing said task using a multicast message communicated from said server computer over said network, wherein the performance of said task is triggered by an event occurring on said server computer or said network;
receiving, by said server computer, a request to complete said task from at least one device and an identifier for said at least one device;

prioritizing requests to complete said task, if more than one request is received by said server computer from each of a plurality of devices, the requests being prioritized based upon the last completion time of a prior request;

searching a task status table using said identifier;

retrieving a status indicator associated with said identifier;

determining whether said task was completed for said at least one device using said status indicator;

performing said task using a unicast message communicated from said server computer over said network to said at least one device in accordance with said determination and said prioritization; and updating said task status table, wherein said task status table comprises said status indicator indicating whether said task has been completed for said at least one device.

5. The method of claim 4, wherein said receiving a request to complete said task from at least one device comprises:

connecting said at least one device to said network; and sending said request to complete said task from said at least one device.

* * * * *